United States Patent
Li

[11] Patent Number: 5,560,668
[45] Date of Patent: Oct. 1, 1996

[54] SUN FILTERING AND SHADING DEVICE FOR AUTOS

[76] Inventor: Ming-Te Li, No. 19, Lane 516, Kung Yuan Road, Tainan, Taiwan

[21] Appl. No.: 534,626

[22] Filed: Sep. 27, 1995

[51] Int. Cl.⁶ .................... B60J 3/02; B60J 1/20
[52] U.S. Cl. .................. 296/97.8; 296/97.4; 160/265; 160/370.22
[58] Field of Search ............... 296/97.4, 97.8, 296/97.7; 160/370.22, 265, 280

[56] References Cited

U.S. PATENT DOCUMENTS

| | | | |
|---|---|---|---|
| 2,255,822 | 9/1941 | Schunk | 160/280 |
| 4,758,041 | 7/1988 | Labeur | 160/280 X |
| 4,979,775 | 12/1990 | Klose | 296/97.8 X |
| 5,064,238 | 11/1991 | Mahtasham | 296/97.8 X |
| 5,201,563 | 4/1993 | Liao | 296/97.4 |
| 5,404,926 | 4/1995 | Ojima et al. | 296/97.4 X |

*Primary Examiner*—Joseph D. Pape
*Attorney, Agent, or Firm*—Morton J. Rosenberg; David I. Klein

[57] ABSTRACT

A sun filtering and shading device for autos has a rod, a pair of elastic elements on two ends of the rod, a pair of gapped pipes fixed besides the door pillar, a pair of T-shaped sliders connected to the pair of elastic elements and a pair of string winders installed on the lower end of the gapped pipes. There are two strings which are connected to the T-shaped sliders and the string winders. Each of the T-shaped sliders are housed inside each of the gapped pipes and the curtain can be raised or lowered using the string winders.

2 Claims, 6 Drawing Sheets

A—A

SUN FILTERING AND SHADING DEVICE FOR AUTOS

BACKGROUND OF THE INVENTION

A common sun shading device for autos includes a rotatable fixing rod, a pair of sucking discs which are fixed on the windshield and connected to two ends of the rotable fixing rod, a curtain which is connected to the rotatabvle fixing rod on one edge, a slotted housing tube for containing the rotatable fixing rod and the wound up curtain, a moving rod connected to the lower edge of the curtain wherein there is a hanger on the moving rod to be hooked with a hook which is installed on the lower part of the windshield. When drivers want to shade the sun, they can pull down the moving rod and hook the hanger on the hook.

However, this common sun shading device has disadvantages as follows:

1. The users have to pull down the moving rod by their hands so this device is used in a less convenient way.

2. Users can't decide for the curtain to be fixed on the suitable position in relation to the position of the sun.

SUMMARY OF THE INVENTION

A sun filtering and shading device for autos has a rotatable fixing rod fixed on the windshield of the autos which is used for a curtain to be wound around, a moving rod with two elastic elements on the ends, two T-shaped sliders connected with the elastic elements, two gapped pipes which is used for the T-shaped slider to move inside, strings and string winders which are used for pulling the T-shaped sliders.

The characteristic of the present invention is intended to overcome the disadvantages mention in the background, wherein when users want to shade the sun from the autos, they can start the string winders so that the T-shaped sliders with the moving rod, the curtain are pulled downwards to shade the sun. Further the string winders can be stopped at any time so that the curtain can be stopped at the users' desired position in relation to the position of the sun.

BRIEF DESCRIPTION OF THE DRAWINGS

The invention will be better understood by reference to the accompanying drawings, wherein.

DESCRIPTION OF THE PREFERRED EMBODIMENTS

Figure 1:
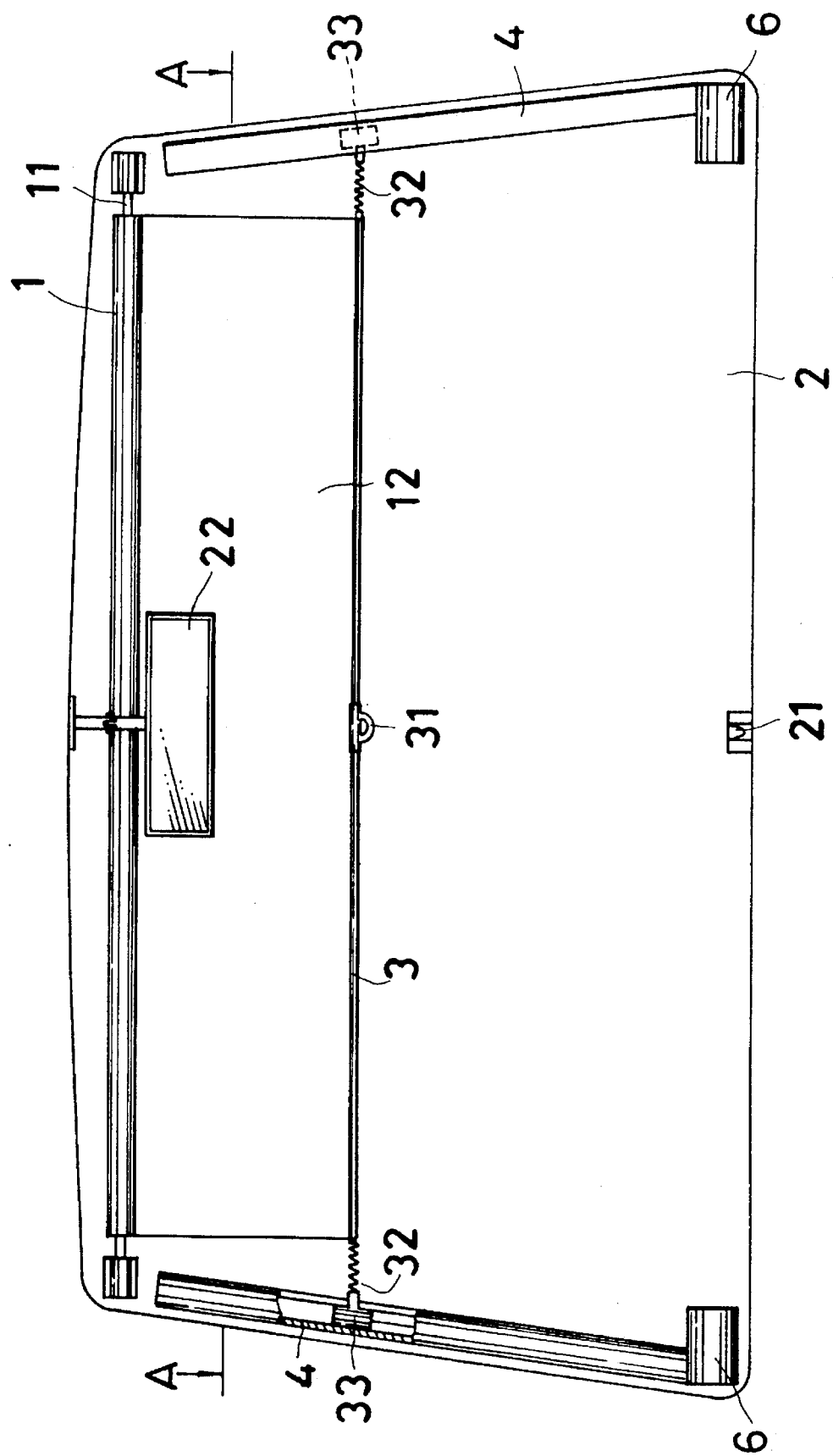
FIG. 1 is a outer appearance view with a partially cross-sectional view in the present invention.

The first embodiment of the present invention, as shown in FIG. 1 having a housing tube 1, a rotatable fixing rod 11 which is fixed on both ends thereof to the windshield and installed inside the housing tube 1, a curtain 12 wound around the fixing rod 11, a moving rod 3 connected to the lower edge of the curtain 12, a hanger 31 on the moving rod 3, a pair of elastic elements 32 on 2 both ends of the moving rod 3, a pair of T-shaped sliders 33 which are connected to the elastic elements 32 and are installed inside a pair of gapped pipes 4 respectively and a pair of string winders 6 connected with the lower end of the gapped pipes 4 and a pair of strings 61, each connected to one of the T-shaped sliders 33 and one of the string winders 6.

There is a hook 21 on the lower part of the windshield for hooking the hanger 31.

Figure 2:
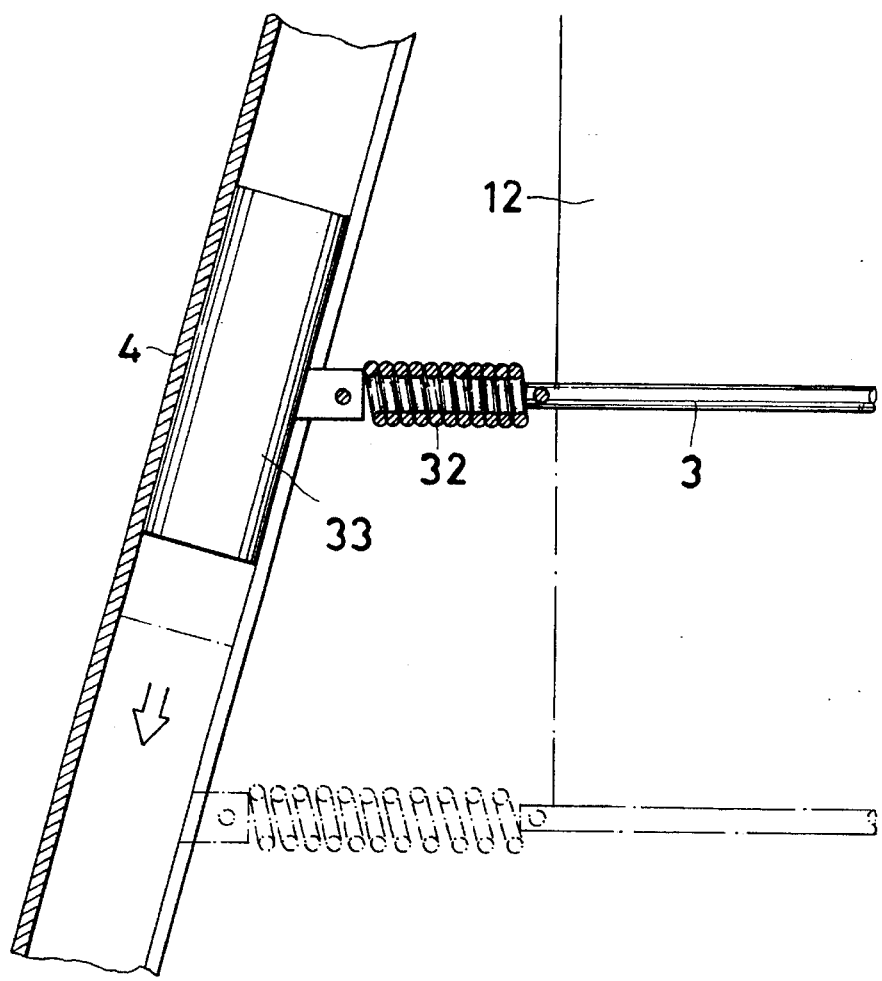
FIG. 2 is an amplified partially cross-sectional view of FIG. 1.
Figure 3:
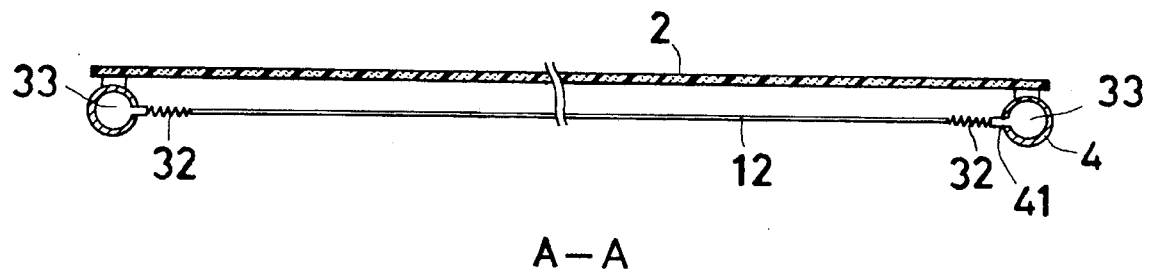
FIG. 3 is a A—A cross-sectional view of FIG. 1.
Figure 4:
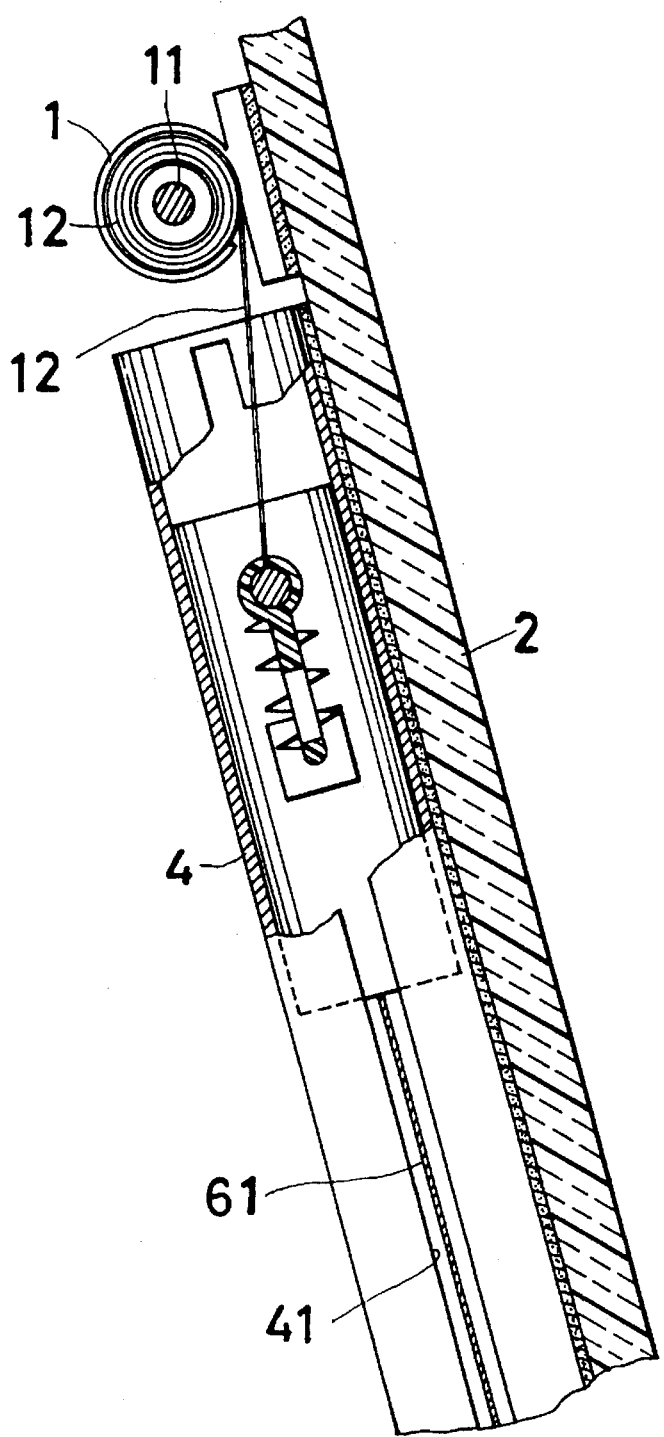
FIG. 4 is an partially amplified cross-sectional view in the present invention.
Figure 5:
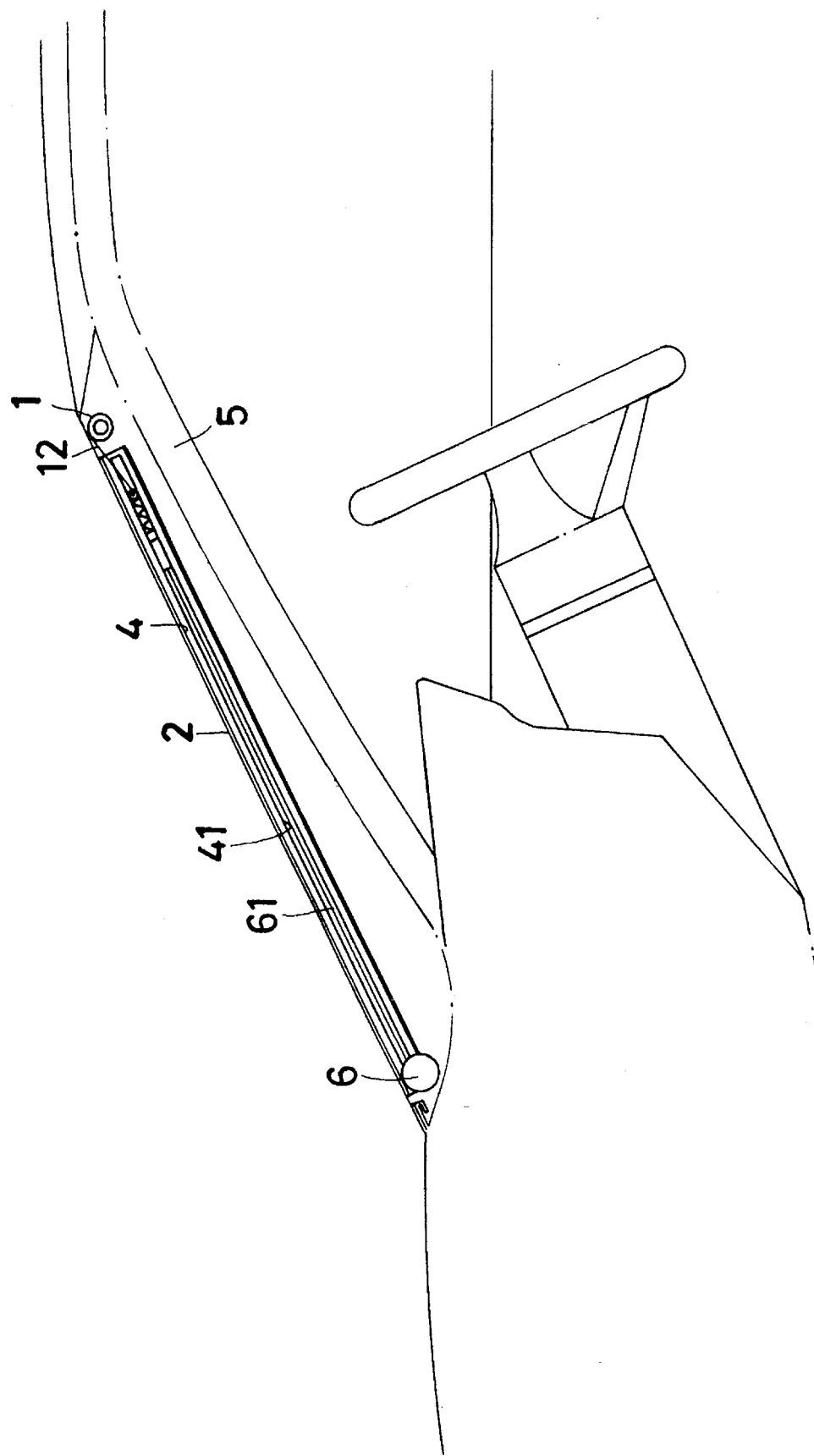
FIG. 5 is an embodiment view in combination in the present invention.

In using the first embodiment, as shown in FIG. 2, when users want to lower the curtain 12 to shade the sun, they can turn on the string winders 6 to pull down the T-shaped sliders 33 so that the moving rods 3 and the curtain 12 can be pulled down together.

Thus when the desired height of the curtain 12 is reached, users can turn off the string winders 6 so that the curtain 12 can be stopped and fixed there, on the other hand when users want to wind up the curtain 12, they also start the string winders 6. Further, the elastic elements 32 on two ends of the moving rod 3 will be compressed or extended according to the horizontal distance change resulting from the tilt of the gapped pipes 4.

Figure 6:
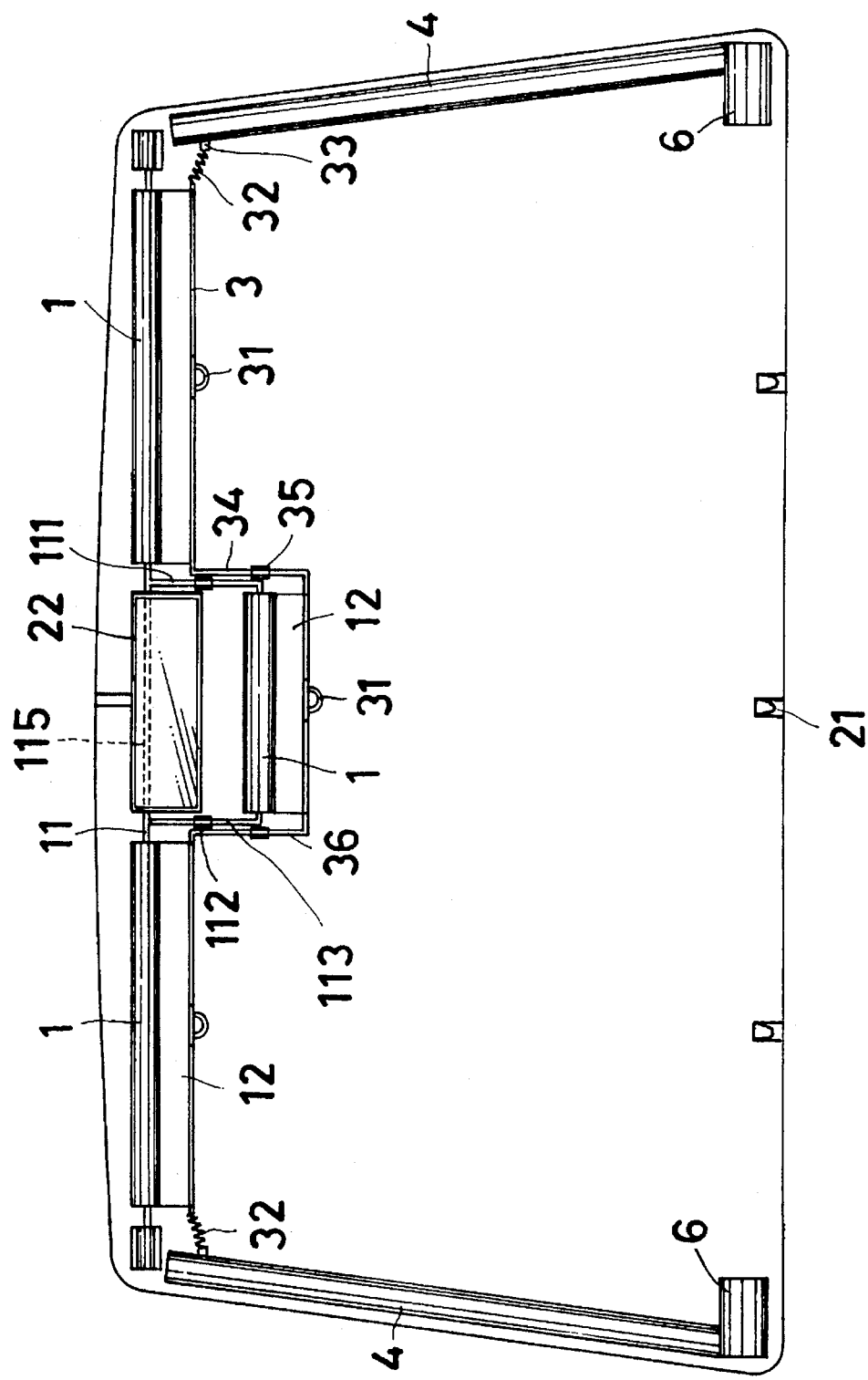
FIG. 6 is the second embodiment view of the present invention.
Figure 7:
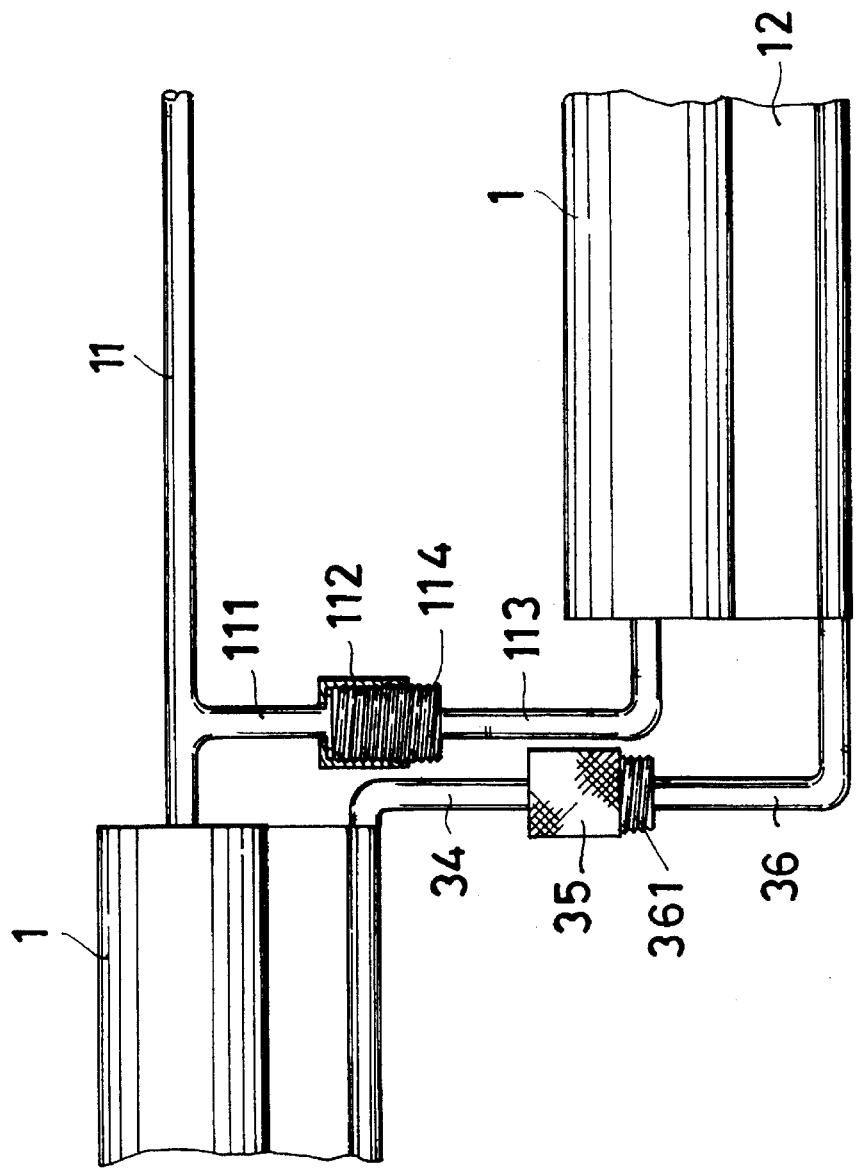
FIG. 7 is a partially amplified view of the second embodiment in the present invention.

The second embodiment of the present invention, as shown in FIG. 6 and 7, which is installed under a rearview mirror 22 of the autos and mainly has a pair of branch rods 111 protruding downwards which are connected to inner ends of two rotatable fixing rods 11, which have, an intervening rod 115, and has a pair of branch moving rods 34 protruding downwards which are connected to inner ends of 2 moving rods 3. Further the end of each of the branch rods 111 has a sleeve nut 112 and the end of each of the branch moving rods 34 has a sleeve nut 35, wherein threaded ends 114 of a U-shaped fixing rod 113 can be fixed into the sleeve nuts 112 by means of threads and also threaded ends 361 of a U-shaped moving rod 36 can be fixed into the sleeve nuts 35 by means of threads. The U-shaped fixing rod 113 is connected with the curtain 12 housed inside the, housing tube 1, and also, the lower edge of the curtain 12 is connected with the U-shaped moving rod 36. The U-shaped fixing rod 113 and the U-shaped moving rod 36 can be taken down by turning the sleeve nuts 112 or 35 if users want to.

The moving rod 3 and the U-shaped moving rod 36 each have hangers 31, which can be hooked with a respective one of the hooks 21.

While the preferred embodiments of the invention have been described above, it will be recognized and understood that various modifications may be made therein and the appended claims are intended to cover all such modifications which may fall within the spirit and scope of the invention.

What is claimed is:

1. A sun filtering and shading device for an automobile, comprising:

a first housing tube;

a fixing rod disposed within said first housing tube, said fixing rod having first and second ends respectively mounted to a windshield of the automobile;

a first curtain having an upper and lower end, said upper end thereof being connected to said fixing rod within said first housing tube;

a longitudinally extended moving rod connected to said lower end of said first curtain, said moving rod having first and second ends, said moving rod having at least one hanger attached thereto;

a pair of gapped pipes, each of said gapped pipes being affixed to an opposing side portion the windshield;

a pair of string winders respectively coupled to a lower end of said pair of gapped pipes, each of said pair of string winders being connected to a lower end of a length of string extending through a respect one of said pair of gapped pipes for winding and unwinding said length of string; and, a pair of slider members respectively coupled to said first and second ends of said moving rod by a respective one of a pair of elastic elements, each of said pair of slider members being disposed in a respective one of said pair of gapped pipes, each of said pair of slider members being coupled to an upper end of a respective length of said string and being slidably displaced along said gapped pipes responsive to said winding and unwinding of said length of string, whereby said displacement of said slider members imparts a corresponding displacement to said moving rod and said first curtain connected thereto.

2. The sun filtering and shading device as recited in claim 1 further comprising:

a second housing tube having said fixing rod extending therethrough, said first housing tube being located adjacent said first end of said fixing rod and said second housing tube being located adjacent said second end of said fixing rod;

a second curtain having an upper and lower end, said upper end thereof being connected to said fixing rod within said second housing tube and said lower end being coupled to said moving rod;

a pair of branch rods coupled to said fixing rod and extending downward therefrom, each of said branch rods having a distal end terminated with a sleeve nut;

a third housing tube positioned between said pair of branch rods;

a U-shaped fixing rod having first and second upward extending arms and an elongate middle portion extending therebetween and through said third housing tube, said first and second upwardly extending arms each having a threaded distal end for threaded engagement with a respective one of said sleeve nuts of said pair branch rods;

a third curtain having an upper and lower end, said upper end thereof being connected to said middle portion of said U-shaped fixing rod within said third housing tube; and, a pair of branch moving rods coupled to longitudinally spaced portions of said moving rod and extending downward therefrom, each of said branch moving rods having a distal end terminated with a sleeve nut for releasable coupling with an intermediate moving rod portion, said intermediate moving rod portion having first and second upward extending arms and an elongate middle portion extending therebetween, each of said first and second upward extending arms of said intermediate moving rod portion having a threaded distal end for threaded engagement with a respective one of said sleeve nuts of said pair of branch moving rods, said elongate middle portion being connected to said lower end of said third curtain.

* * * * *